(No Model.)
W. T. WALTON.
BARBED WIRE.
No. 437,805. Patented Oct. 7, 1890.
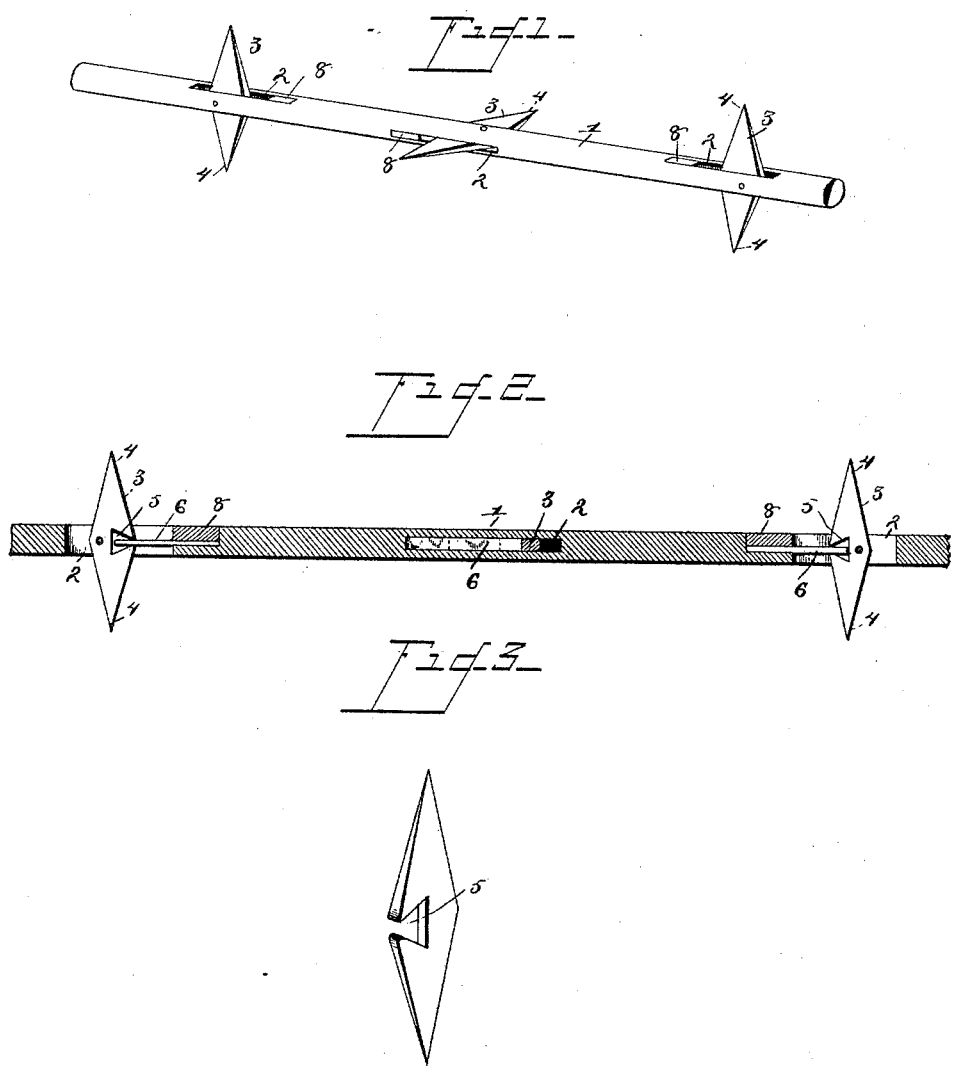
Witnesses
Geo. E. Frech.
H. F. Riley.
Inventor
William T Walton
By his Attorneys,
C A Snow & Co.

UNITED STATES PATENT OFFICE.

WILLIAM T. WALTON, OF MAYVILLE, OREGON.

BARBED WIRE.

SPECIFICATION forming part of Letters Patent No. 437,805, dated October 7, 1890.

Application filed April 25, 1890. Serial No. 349,544. (No model.)

*To all whom it may concern:*

Be it known that I, WILLIAM T. WALTON, a citizen of the United States, residing at Mayville, in the county of Gilliam and State of Oregon, have invented a new and useful Barbed Wire, of which the following is a specification.

The invention relates to improvements in barbed wire.

The object of the present invention is to provide a barbed wire for fencing in which the barbs will when touched by animals be turned aside and be prevented injuring the same.

The invention consists in the construction and novel combination and arrangement of parts, hereinafter fully described, illustrated in the accompanying drawings, and pointed out in the claims hereto appended.

In the drawings, Figure 1 is a perspective view of a piece of barbed wire constructed in accordance with this invention. Fig. 2 is a central longitudinal sectional view, the barbs being shown in elevation. Fig. 3 is a detail perspective view of one of the barbs.

Referring to the accompanying drawings, 1 designates a piece of barbed wire, which is provided throughout its length with a series of longitudinal slots 2, that are arranged at right angles to each other and have pivoted in them barbs 3. The barbs are constructed of flat pieces of metal and have their ends 4 tapering, and are pivoted centrally and provided with a central opening 5, that is approximately triangular and is engaged by a spring 6, that maintains the barb at right angles to the wire, but allows it to be turned aside when touched by an animal, thereby causing only a slight scratch and preventing any serious injury to cattle. The spring has one end secured in a recess 7, that is arranged at one end of and communicating with the longitudinal slot 2, and the said spring is secured in the recess by a block 8, whose outer face lies flush with the outer surface of the wire 1. The free end of the spring 6 is arranged in the central triangular opening 5 of the barb 3, and when the barb is turned aside engages one of the walls of the opening and returns the barb to its normal position to the wire.

It will thus be seen that the barb wire constructed in accordance with this invention is simple and comparatively cheap in its construction, and will not seriously injure the cattle coming in contact with it, but its barbs will be turned aside and only scratch slightly, if at all.

Having thus described my invention, I claim—

1. A wire provided with barbs having pointed ends and pivoted intermediate of their ends and adapted to be turned aside to prevent injury to cattle, substantially as described.

2. A wire provided with barbs having pointed ends and pivoted intermediate of their ends and having a spring engaging the barbs and holding them normally at right angles to the wire, said barbs being adapted to be turned aside, substantially as and for the purpose described.

3. A wire provided with longitudinal slots, in combination with barbs having pointed ends and pivoted intermediate of their ends in the slots and springs secured to the wire and engaging the barbs and holding the same at right angles to the wire, substantially as and for the purpose described.

4. The combination of a wire provided with longitudinal slots and having recesses 7, communicating with the slots, the barbs pivoted centrally in the slots and provided with central openings, springs secured in the recesses and having their free ends engaging the central openings of the barbs and maintaining the latter at right angles to the wire, and the blocks 8, secured in the recesses, substantially as and for the purpose described.

In testimony that I claim the foregoing as my own I have hereto affixed my signature in presence of two witnesses.

WILLIAM T. WALTON.

Witnesses:
   H. H. HENDRICKS,
   LILLIE WALTON.